US012670373B2

(12) United States Patent
Lagudu et al.

(10) Patent No.: US 12,670,373 B2
(45) Date of Patent: Jun. 30, 2026

(54) MEMORY BANDWIDTH REDUCTION TECHNIQUES FOR LOW POWER CONVOLUTIONAL NEURAL NETWORK INFERENCE

(71) Applicants:Advanced Micro Devices, Inc., Santa Clara, CA (US); ATI Technologies ULC, Markham (CA)

(72) Inventors: Sateesh Lagudu, Hyderabad (IN); Lei Zhang, Richmond Hill (CA); Allen Rush, Danville, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 1191 days.

(21) Appl. No.: 17/571,045

(22) Filed: Jan. 7, 2022

(65) Prior Publication Data

US 2022/0129752 A1     Apr. 28, 2022

Related U.S. Application Data

(63) Continuation of application No. 15/812,336, filed on Nov. 14, 2017, now Pat. No. 11,227,214.

(51) Int. Cl.
| | |
|---|---|
| *G06N 3/06* | (2006.01) |
| *G06F 1/3296* | (2019.01) |
| *G06N 3/063* | (2023.01) |

(52) U.S. Cl.
CPC ........... *G06N 3/063* (2013.01); *G06F 1/3296* (2013.01)

(58) Field of Classification Search
CPC .......... G06N 3/0464; G06N 3/04; G06N 3/08; G06N 3/0895; G06N 3/09; G06N 3/091;
(Continued)

(56) References Cited

U.S. PATENT DOCUMENTS

| | | | |
|---|---|---|---|
| 4,873,630 A | 10/1989 | Rusterholz et al. | |
| 5,657,420 A | 8/1997 | Jacobs et al. | |

(Continued)

FOREIGN PATENT DOCUMENTS

| | | |
|---|---|---|
| CN | 107003988 A | 8/2017 |
| CN | 108701236 A | 10/2018 |

(Continued)

OTHER PUBLICATIONS

Howard et al., "MobileNets: Efficient Convolutional Neural Networks for Mobile Vision Applications", Apr. 17, 2017, arXiv.com, pp. 1-9 (Year: 2017).*

(Continued)

*Primary Examiner* — Paulinho E Smith
(74) *Attorney, Agent, or Firm* — Kowert, Hood, Munyon, Rankin & Goetzel, P.C.; Rory D. Rankin

(57) ABSTRACT

Systems, apparatuses, and methods for implementing memory bandwidth reduction techniques for low power convolutional neural network inference applications are disclosed. A system includes at least a processing unit and an external memory coupled to the processing unit. The system detects a request to perform a convolution operation on input data from a plurality of channels. Responsive to detecting the request, the system partitions the input data from the plurality of channels into 3D blocks so as to minimize the external memory bandwidth utilization for the convolution operation being performed. Next, the system loads a selected 3D block from external memory into internal memory and then generates convolution output data for the selected 3D block for one or more features. Then, for each feature, the system adds convolution output data together across channels prior to writing the convolution output data to the external memory.

20 Claims, 13 Drawing Sheets

(58) Field of Classification Search
CPC ........ G06N 3/092; G06N 3/094; G06N 3/096;
G06N 3/098; G06N 3/0985
See application file for complete search history.

(56) References Cited

U.S. PATENT DOCUMENTS

| | | | |
|---|---|---|---|
| 6,067,287 | A | 5/2000 | Chung-Ju et al. |
| 8,055,881 | B2 | 11/2011 | Burger et al. |
| 8,131,660 | B2 | 3/2012 | Davis et al. |
| 8,369,595 | B1 | 2/2013 | Derakhshani et al. |
| 9,082,078 | B2 * | 7/2015 | Palmer ................... G06N 3/063 |
| 9,319,137 | B2 | 4/2016 | Zhuge et al. |
| 9,430,735 | B1 | 8/2016 | Vali et al. |
| 9,911,067 | B2 * | 3/2018 | Hikida ................... H04N 23/60 |
| 10,078,794 | B2 | 9/2018 | Pierce et al. |
| 10,380,969 | B2 * | 8/2019 | Meixner ............ H04N 1/32358 |
| 10,515,046 | B2 * | 12/2019 | Fleming ................ G06F 9/5027 |
| 10,582,250 | B2 | 3/2020 | Zhang et al. |
| 10,740,674 | B2 | 8/2020 | Ambrose et al. |
| 10,762,392 | B2 | 9/2020 | Zhang et al. |
| 10,776,684 | B1 | 9/2020 | Agarwal et al. |
| 11,157,814 | B2 * | 10/2021 | Howard ................. G06N 3/082 |
| 11,227,214 | B2 | 1/2022 | Lagudu et al. |
| 11,526,731 | B2 * | 12/2022 | Nekuii ................... G06N 3/063 |
| 2002/0152441 | A1 | 10/2002 | Senda et al. |
| 2006/0031652 | A1 | 2/2006 | Richter et al. |
| 2007/0030926 | A1 | 2/2007 | Brown et al. |
| 2011/0078342 | A1 | 3/2011 | Siddabathuni et al. |
| 2011/0296212 | A1 | 12/2011 | Elnozahy et al. |
| 2014/0244248 | A1 | 8/2014 | Arisoy et al. |
| 2015/0178246 | A1 | 6/2015 | Herrero Abellanas et al. |
| 2015/0242322 | A1 | 8/2015 | Vajapeyam |
| 2015/0358755 | A1 | 12/2015 | Luo et al. |
| 2016/0025999 | A1 | 1/2016 | Chen |
| 2016/0062294 | A1 | 3/2016 | Murashima |
| 2016/0179434 | A1 | 6/2016 | Herrero Abellanas et al. |
| 2016/0259994 | A1 | 9/2016 | Ravindran et al. |
| 2016/0350645 | A1 | 12/2016 | Brothers et al. |
| 2016/0379073 | A1 | 12/2016 | Pan et al. |
| 2016/0379109 | A1 | 12/2016 | Chung et al. |
| 2017/0124451 | A1 | 5/2017 | Barham et al. |
| 2017/0286864 | A1 | 10/2017 | Fiedel et al. |
| 2017/0316312 | A1 | 11/2017 | Goyal et al. |
| 2017/0344882 | A1 | 11/2017 | Ambrose et al. |
| 2018/0008221 | A1 | 1/2018 | Ito |
| 2018/0032859 | A1 | 2/2018 | Park et al. |
| 2018/0032867 | A1 | 2/2018 | Son et al. |
| 2018/0036558 | A1 | 2/2018 | Carpentier et al. |
| 2018/0046900 | A1 | 2/2018 | Dally et al. |
| 2018/0082212 | A1 | 3/2018 | Faivishevsky et al. |
| 2018/0089087 | A1 | 3/2018 | Chang et al. |
| 2018/0096226 | A1 | 4/2018 | Aliabadi et al. |
| 2018/0121196 | A1 * | 5/2018 | Temam ................... G06F 13/28 |
| 2018/0137406 | A1 * | 5/2018 | Howard ................... G06N 3/04 |
| 2018/0174036 | A1 | 6/2018 | Han et al. |
| 2018/0189641 | A1 | 7/2018 | Boesch et al. |
| 2018/0218303 | A1 | 8/2018 | Cole et al. |
| 2018/0262291 | A1 | 9/2018 | Doster et al. |
| 2018/0338159 | A1 * | 11/2018 | Kapoor ................... G06N 3/02 |
| 2018/0350110 | A1 * | 12/2018 | Cho .......................... G06F 7/08 |
| 2018/0365558 | A1 | 12/2018 | Sekiyama et al. |
| 2018/0365794 | A1 * | 12/2018 | Lee ......................... G06N 3/048 |
| 2019/0026237 | A1 | 1/2019 | Talpes et al. |
| 2019/0042948 | A1 * | 2/2019 | Lee ......................... G06N 3/063 |
| 2019/0205745 | A1 | 7/2019 | Sridharan et al. |
| 2019/0266015 | A1 | 8/2019 | Chandra et al. |
| 2019/0324755 | A1 | 10/2019 | Herr et al. |
| 2019/0324759 | A1 | 10/2019 | Yang et al. |
| 2019/0325296 | A1 | 10/2019 | Fowers et al. |
| 2019/0325305 | A1 | 10/2019 | Zhang et al. |
| 2020/0134432 | A1 | 4/2020 | Lagudu et al. |
| 2020/0258223 | A1 | 8/2020 | Yip et al. |
| 2020/0302285 | A1 | 9/2020 | Wang et al. |
| 2020/0401872 | A1 * | 12/2020 | Nekuii ................... G06F 17/153 |

FOREIGN PATENT DOCUMENTS

| | | |
|---|---|---|
| CN | 108734645 A | 11/2018 |
| EP | 3098762 A1 | 11/2016 |
| JP | 2005215058 A | 8/2005 |
| JP | 2014203135 A | 10/2014 |
| JP | 2016033806 A | 3/2016 |
| JP | 2017151604 A | 8/2017 |
| KR | 10-2017-0023708 | 3/2017 |
| WO | 2014119746 | 1/2014 |
| WO | 2017003887 A1 | 1/2017 |
| WO | 2017185412 A1 | 11/2017 |

OTHER PUBLICATIONS

Office Action in Chinese Patent Application No. 201910201492.3 dated Feb. 27, 2025, 15 pgs.

Non-Final Office Action in U.S. Appl. No. 16/117,302, mailed Jan. 12, 2022, 66 pages.

Lin et al., "Deep Gradient Compression: Reducing the Communication Bandwidth for Distributed Training", ICLR 2018 Conference, Dec. 5, 2017, 13 pages.

Non-Final Office Action in U.S. Appl. No. 17/006,533, mailed Jan. 27, 2022, 12 pages.

First Examination Report in Indian Patent Application No. 202017020013, mailed Mar. 28, 2022, 7 pages.

Non-Final Office Action in Japanese Patent Application No. 2020-544323, mailed Aug. 23, 2022, 9 pages.

Final Office Action in U.S. Appl. No. 16/117,302, mailed Sep. 14, 2022, 74 pages.

Li et al., "A High Performance FPGA-Based Accelerator for Large-Scale Convolutional Neural Networks" 2016 26th International Conference on Field Programmable Logic and Applications (FPL), 2016, 9 pages.

Final Office Action in U.S. Appl. No. 16/367,093, mailed Dec. 16, 2022, 17 pages.

Advisory Action in U.S. Appl. No. 16/117,302, mailed Feb. 28, 2023, 4 pages.

Non-Final Office Action in U.S. Appl. No. 18/050,939, mailed Mar. 29, 2023, 13 pages.

Non-Final Office Action in U.S. Appl. No. 16/367,093, mailed May 19, 2022, 15 pages.

Non-Final Office Action in U.S. Appl. No. 16/177,218, mailed May 23, 2022, 16 pages.

Notice of Allowance in U.S. Appl. No. 17/006,533, mailed Jul. 5, 2022, 8 pages.

Office Action in JP Patent Application No. 2023-213617 dated Mar. 4, 2025, 9 pgs.

Hearing Notice and Revised Hearing Notice in Indian Patent Application No. 202017020013, mailed Jun. 10, 2024 and Jul. 24, 2024, respectively, 6 pages.

Non-Final Office Action in U.S. Appl. No. 15/657,613, mailed Oct. 5, 2018, 12 pages.

Final Office Action in U.S. Appl. No. 15/657,613, mailed Mar. 8, 2019, 10 pages.

International Search Report and Written Opinion in International Application No. PCT/US2018/052358, mailed Feb. 18, 2019, 13 pages.

Cecconi et al., "Optimal Tiling Strategy for Memory Bandwidth Reduction for CNNs", International Conference on Advanced Concepts for Intelligent Vision Systems, Sep. 18, 2017, pp. 89-100.

Fan et al., "F-C3D: FPGA-based 3-Dimensional Convolutional Neural Network", 27th International Conference on Field Programmable Logic and Applications (FPL), Sep. 4, 2017, 4 pages.

Rahman et al., "Efficient FPGA Acceleration of Convolutional Neural Networks Using Logical-3D Compute Array", Proceedings of the 2016 Conference on Design, Automation & Test in Europe, Mar. 14, 2016, pp. 1393-1398.

Notice of Allowance in U.S. Appl. No. 16/234,956, mailed May 5, 2020, 10 pages.

Office Action in Chinese Patent Application No. 201880073531 mailed Nov. 16, 2023, 6 pgs.

(56)     References Cited

OTHER PUBLICATIONS

Office Action in Japanese Patent Application No. 2020-544323, mailed Apr. 11, 2023, 9 pgs.
Office Action in Korean Patent Application No. 10-2020-7014030, mailed Jun. 21, 2023, 11 pgs.

* cited by examiner

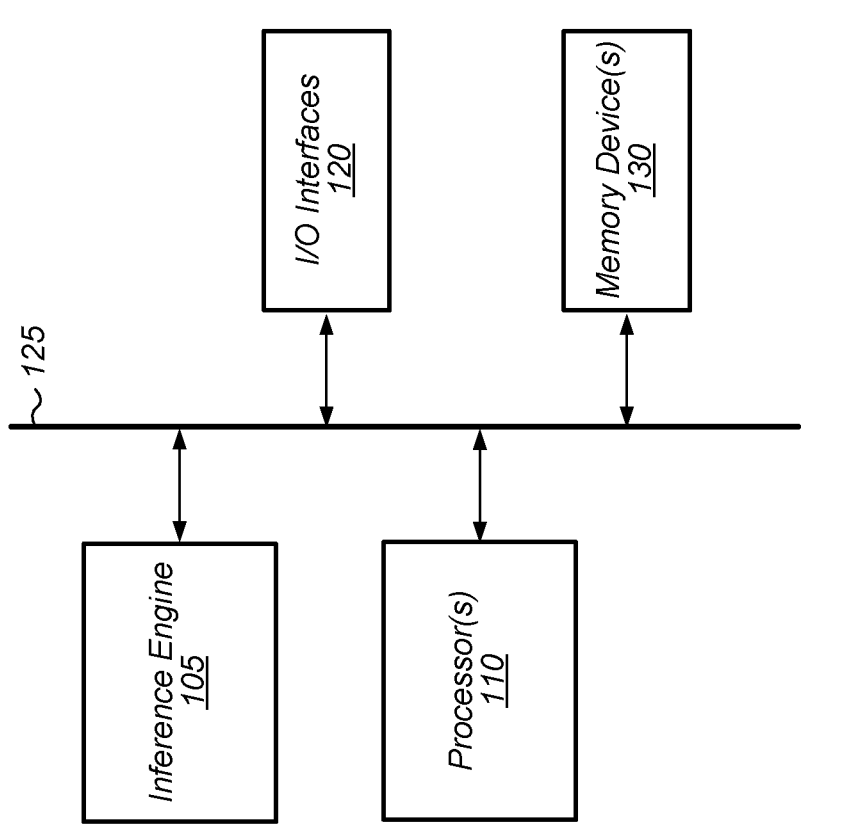
FIG. 1

*400*

Convolution Computation for Channel=0 associated with all Features *402A*

*404* — Idata[ch=0]:

*410A* — Coeff[feat=0][ch=0]

*415A* — Odata[ch=0][feat=0]

*420A* — Ch[0] Feat[0] Memory

*430A* — Feat-0 Adder

*440A* — Result Feat-0

*410B* — Coeff[feat=1][ch=0]

*415B* — Odata[ch=0][feat=1]

*420B* — Ch[0] Feat[1] Memory

*430B* — Feat-1 Adder

*440B* — Result Feat-1

*410M* — Coeff[feat=M-1][ch=0]

*415M* — Odata[ch=0][feat=M-1]

*420M* — Ch[0] Feat[M-1] Memory

*430M* — Feat[M-1] Adder

*440M* — Result Feat-M-1

*402B* — Convolution Computation for Channel=1 associated with all Features

*402N* — Convolution Computation for Channel=N-1 associated with all Features

*FIG. 4*

*500*

*Convolution Computation for Channel=0 associated with all Features* — 502A

504 — Idata[ch=0]:

510A — Coef[feat=0][ch=0]

515A — Odata[ch=0][feat=0]

510B — Coef[feat=1][ch=0]

515B — Odata[ch=0][feat=1]

510M — Coef[feat=M-1][ch=0]

515M — Odata[ch=0][feat=M-1]

520A — *Feat-0 Adder*

520B — *Feat-1 Adder*

520M — *Feat[M-1] Adder*

530A — *Result Feat[0] Memory*

530B — *Result Feat[1] Memory*

530M — *Result Feat[M-1] Memory*

502B — *Convolution Computation for Channel=1 associated with all Features*

502N — *Convolution Computation for Channel=N-1 associated with all Features*

*FIG. 5*

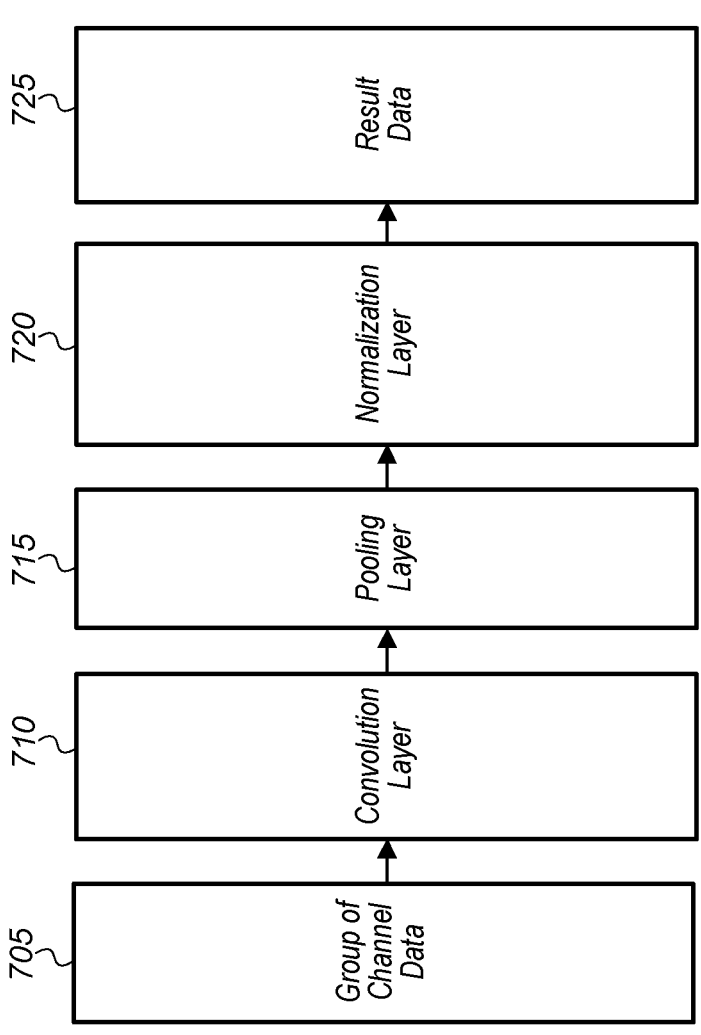
*FIG. 7*

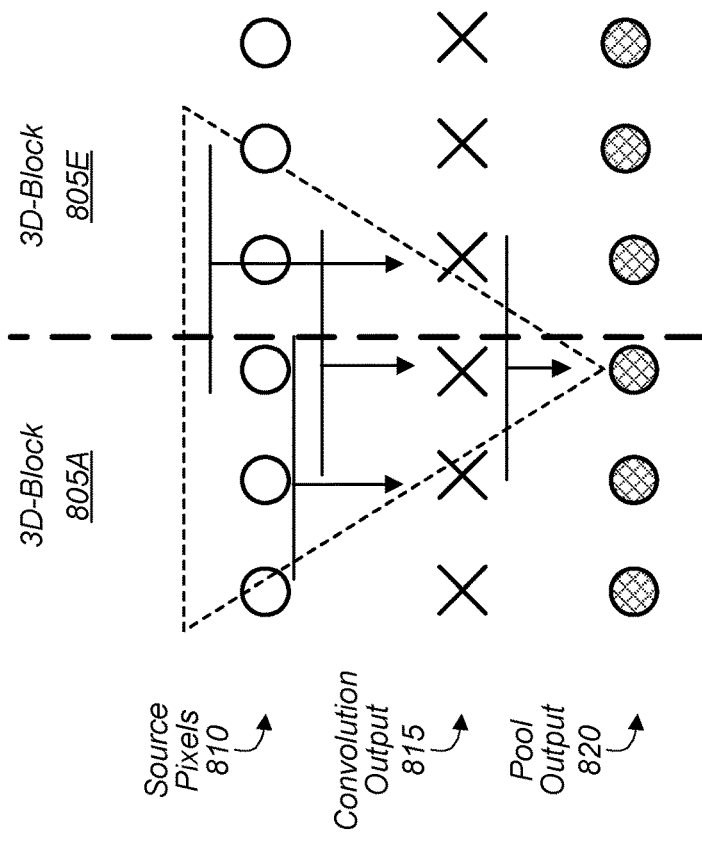
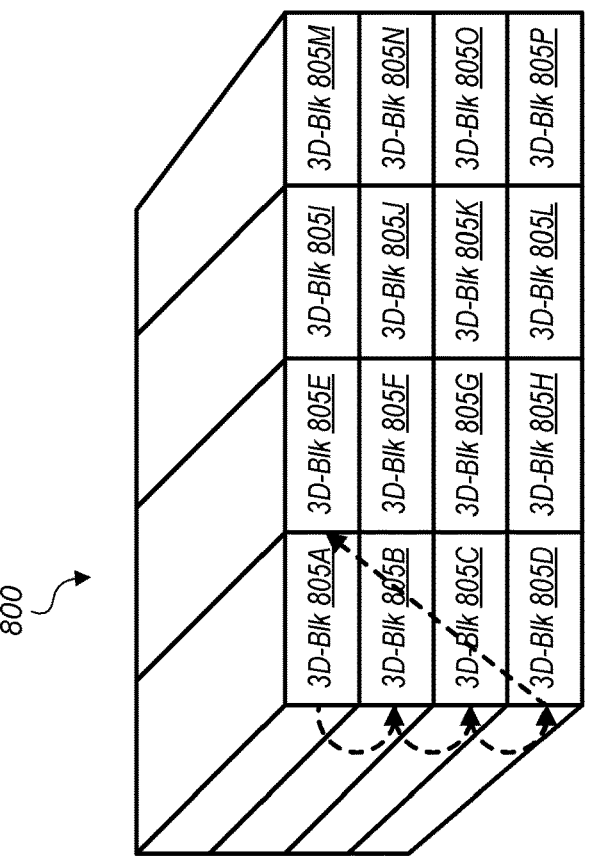
FIG. 8

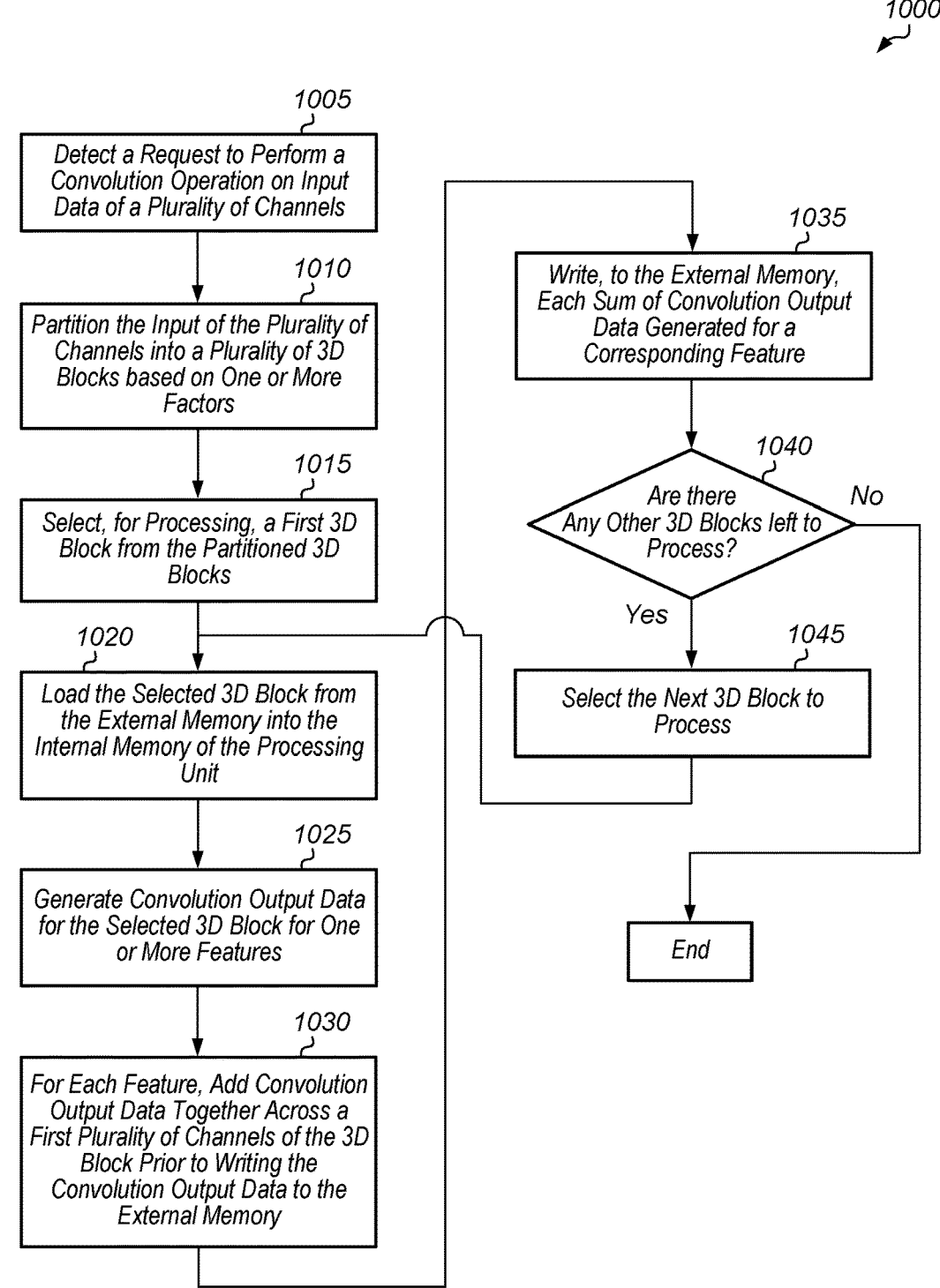

*1000*

*1005*

Detect a Request to Perform a Convolution Operation on Input Data of a Plurality of Channels

*1010*

Partition the Input of the Plurality of Channels into a Plurality of 3D Blocks based on One or More Factors

*1015*

Select, for Processing, a First 3D Block from the Partitioned 3D Blocks

*1020*

Load the Selected 3D Block from the External Memory into the Internal Memory of the Processing Unit

*1025*

Generate Convolution Output Data for the Selected 3D Block for One or More Features

*1030*

For Each Feature, Add Convolution Output Data Together Across a First Plurality of Channels of the 3D Block Prior to Writing the Convolution Output Data to the External Memory

*1035*

Write, to the External Memory, Each Sum of Convolution Output Data Generated for a Corresponding Feature

*1040*

Are there Any Other 3D Blocks left to Process?

No

Yes

*1045*

Select the Next 3D Block to Process

End

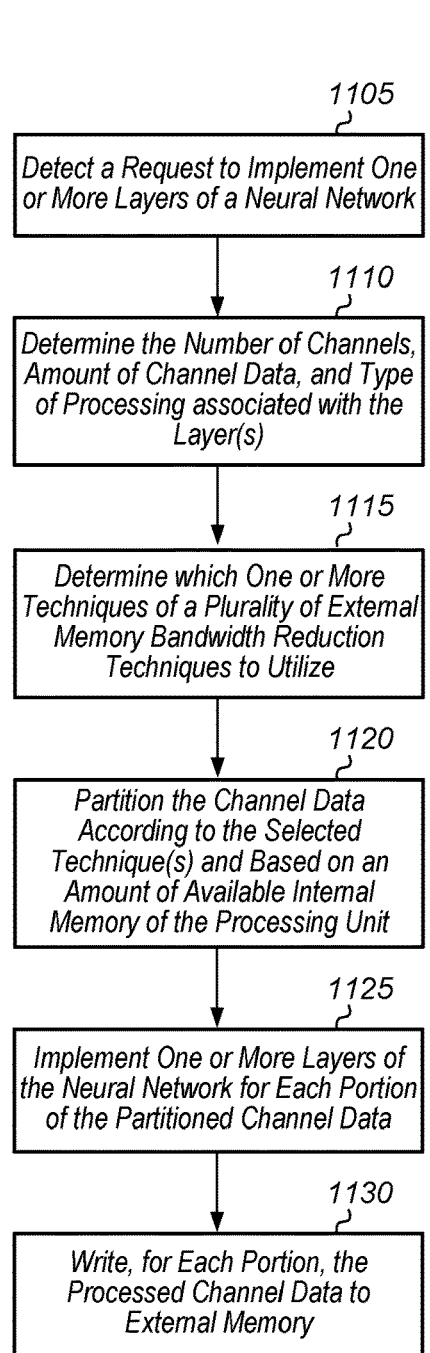

*1105*

Detect a Request to Implement One or More Layers of a Neural Network

*1110*

Determine the Number of Channels, Amount of Channel Data, and Type of Processing associated with the Layer(s)

*1115*

Determine which One or More Techniques of a Plurality of External Memory Bandwidth Reduction Techniques to Utilize

*1120*

Partition the Channel Data According to the Selected Technique(s) and Based on an Amount of Available Internal Memory of the Processing Unit

*1125*

Implement One or More Layers of the Neural Network for Each Portion of the Partitioned Channel Data

*1130*

Write, for Each Portion, the Processed Channel Data to External Memory

*FIG. 11*

MEMORY BANDWIDTH REDUCTION TECHNIQUES FOR LOW POWER CONVOLUTIONAL NEURAL NETWORK INFERENCE

CROSS REFERENCE TO RELATED APPLICATIONS

This application is a continuation of U.S. patent application Ser. No. 15/812,336, now U.S. Pat. No. 11,227,214, entitled "MEMORY BANDWIDTH REDUCTION TECHNIQUES FOR LOW POWER CONVOLUTIONAL NEURAL NETWORK INFERENCE APPLICATIONS", filed Nov. 14, 2017, the entirety of which is incorporated herein by reference.

BACKGROUND

Description of the Related Art

An emerging technology field is machine learning, with a convolutional neural network being one type of a machine learning model. Convolutional neural networks have demonstrated excellent performance at tasks such as handwritten digit classification and face detection. Additionally, convolutional neural networks have also shown promise for performing well in other, more challenging visual classification tasks. Machine learning models utilize significant amounts of processing resources and external memory bandwidth. Accordingly, techniques for improving performance and/or reducing memory bandwidth utilization of machine learning models are desired.

BRIEF DESCRIPTION OF THE DRAWINGS

The advantages of the methods and mechanisms described herein may be better understood by referring to the following description in conjunction with the accompanying drawings, in which:

FIG. 1 is a block diagram of one embodiment of a computing system.

FIG. 4 is a block diagram of one embodiment of an inference engine.

FIG. 5 is a block diagram of another embodiment of an inference engine.

FIG. 7 is a block diagram of another embodiment of an inference engine.

FIG. 8 is a block diagram of one embodiment of using a vertical order for processing memory blocks to reduce external memory bandwidth utilization in a neural network implementation.

FIG. 10 is a generalized flow diagram illustrating one embodiment of a method for implementing a convolutional layer.

FIG. 11 is a generalized flow diagram illustrating another embodiment of a method for selecting techniques for external memory bandwidth reduction.

DETAILED DESCRIPTION OF EMBODIMENTS

Figure 2:
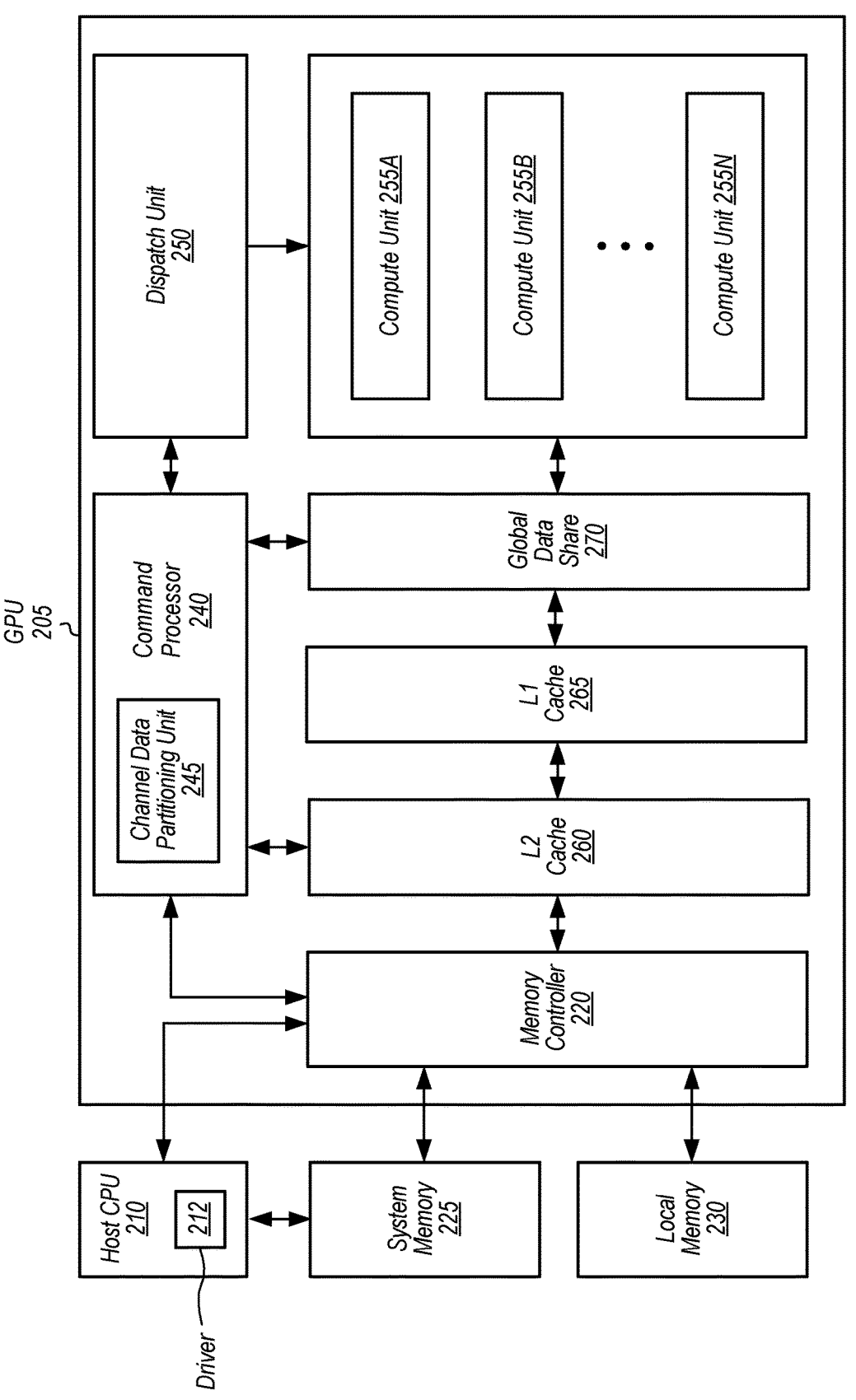
FIG. 2 is a block diagram of another embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing memory bandwidth reduction techniques for low power convolutional neural network inference applications are disclosed herein. In one embodiment, a system includes at least a processing unit and an external memory coupled to the processing unit. In one embodiment, the processing unit is a graphics processing unit (GPU). In other embodiments, the processing unit can be other types of processing units (e.g., application specific integrated circuit (ASIC), field programmable gate array (FPGA), digital signal processor (DSP), central processing unit (CPU)). In one embodiment, the processing unit includes at least a command processor, one or more compute units, and one or more caches. The one or more caches can also be referred to as the internal memory of the processing unit.

In one embodiment, the system detects a request to perform a convolution operation on input data from a plurality of channels. In one embodiment, the convolution operation on the input data from the plurality of channels is implemented as part of a convolutional layer of a neural network. Responsive to detecting the request, the system partitions the input data from the plurality of channels into three-dimensional (3D) blocks based on one or more factors. The one or more factors include determining how to minimize the external memory bandwidth utilization for the convolution operation being performed. In another embodiment, the one or more factors include a size of the internal memory, a size of the one or more features, and/or a size of the convolution.

After partitioning the input data from the plurality of channels into a plurality of 3D blocks, the system selects a first 3D block for processing and loads the selected 3D block from the external memory into the internal memory of the processing unit. Next, the system generates convolution output data for the selected 3D block for one or more features. Then, for each feature of the one or more features, the system adds convolution output data together across a first plurality of channels of the 3D block prior to writing the convolution output data to the external memory. Next, the system writes, to the external memory, each sum of convolution output data, across the first plurality of channels, generated for a corresponding feature. Then, the system selects the next 3D block to process. In one embodiment, the system follows a particular pattern of processing 3D blocks in order to minimize the external memory bandwidth utilization. In one embodiment, the system starts by selecting the top left 3D block and then proceeds in a vertical direction down until the bottom boundary of the entirety of the input data is reached. Then, the system moves one column over to the right and starting at the top of the column, processes each 3D block moving down the column. This pattern of processing 3D blocks can continue for the remainder of the 3D blocks.

Referring now to FIG. 1, a block diagram of one embodiment of a computing system 100 is shown. In one embodiment, computing system 100 includes at least inference engine 105, processor(s) 110, input/output (I/O) interfaces 120, bus 125, and memory device(s) 130. It is noted that inference engine 105 can also be referred to as convolutional neural network 105 or neural network 105. In other embodiments, computing system 100 can include other components and/or computing system 100 can be arranged differently.

In one embodiment, inference engine 105 is implemented on a processing unit (e.g., graphics processing unit (GPU)). In another embodiment, inference engine 105 is implemented on programmable logic (e.g., field programmable gate array (FPGA)). In a further embodiment, inference engine 105 is implemented on dedicated logic (e.g., application specific integrated circuit (ASIC)). In other embodiments, inference engine 105 can be implemented on other types of components, other types of logic, and/or any combination of multiple different types of components or processing units.

In one embodiment, inference engine 105 implements one or more layers of a convolutional neural network. For example, in one embodiment, the inference engine implements one or more convolutional layers, one or more pooling layers, one or more normalization layers, and/or one or more fully connected layers. Stacks of layers can be repeated multiple times with the types of stacks (e.g., convolution-normalization-pooling), and layers within the stacks, varying from embodiment to embodiment.

Generally speaking, an "inference engine" is defined as hardware and/or software which receives image data and generates one or more label probabilities for the image data. An "inference engine" can also be referred to as a "classification engine" or a "classifier". In one embodiment, inference engine 105 is a trained neural network. For example, in this embodiment, inference engine 105 is configured to analyze a video frame to generate one or more label probabilities for the video frame. For example, potential use cases include at least eye tracking, object recognition, point cloud estimation, ray tracing, light field modeling, depth tracking, and others. For eye tracking use cases, the inference engine can be based on learned patterns, dwell, transition angles, blink, etc. In other embodiments, the inference engine can be customized for other types of use cases. In one embodiment, the inference engine is approximated by integer or reduced precision weight parameters. These approximations can be close to optimal accuracy and enable substantial speed up and power reduction for the inference engine. Additionally, in one embodiment, the inference engine is implemented with multiple internal channel processing engines to reduce memory bandwidth utilization when implementing a convolutional neural network. In other embodiments, the inference engine can implement other types of machine learning models.

Processors(s) 110 are representative of any number and type of processing units (e.g., central processing unit (CPU), GPU, digital signal processor (DSP), FPGA, ASIC). In one embodiment, some of the processing associated with inference engine 105 is performed by processor(s) 110. Memory device(s) 130 are representative of any number and type of memory devices. For example, the type of memory in memory device(s) 130 can include Dynamic Random Access Memory (DRAM), Static Random Access Memory (SRAM), NAND Flash memory, NOR flash memory, Ferroelectric Random Access Memory (FeRAM), or others. Memory device(s) 130 are accessible by inference engine 105 and processor(s) 110. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various embodiments, computing system 100 can be a computer, laptop, mobile device, game console, server, streaming device, wearable device, or any of various other types of computing systems or devices. It is noted that the number of components of computing system 100 can vary from embodiment to embodiment. There can be more or fewer of each component/subcomponent than the number shown in FIG. 1. It is also noted that computing system 100 can include other components not shown in FIG. 1. Additionally, in other embodiments, computing system 100 can be structured in other ways than shown in FIG. 1.

Turning now to FIG. 2, a block diagram of another embodiment of a computing system 200 is shown. In one embodiment, system 200 includes GPU 205, host CPU 210, system memory 225, and local memory 230. System 200 also includes other components which are not shown to avoid obscuring the figure. An application executes on host CPU 210 and interfaces with driver 212 to send program commands and data to GPU 205. Host CPU 210 is coupled to memory controller 220 and system memory 225. GPU 205 includes at least command processor 240, dispatch unit 250, compute units 255A-N, memory controller 220, global data share 270, level one (L1) cache 265, and level two (L2) cache 260. In other embodiments, GPU 205 can include other components, omit one or more of the illustrated components, and/or be organized in other suitable manners.

Certain types of machine learning and neural network applications have high bandwidth requirements, and an increase in performance and decrease in processing time can be achieved if the external memory bandwidth can be reduced. In some cases, the external memory bandwidth can be the bottleneck when implementing a neural network. Accordingly, any reduction in the external memory bandwidth can result in a significant speed up in execution of a neural network on system 200.

Global data share 270, L1 cache 265, and L2 cache 260 of GPU 205 represent the term "internal memory" as used herein. The internal memory is differentiated from external memory to GPU 205, with system memory 225 and local memory 230 representing the term "external memory" as used herein. In the execution of various neural network applications, GPU 205 is configured to minimize the external memory bandwidth of reading and writing of data to system memory 225 and local memory 230.

In various embodiments, computing system 200 is configured to implement any of various types of machine learning algorithms. For example, in one embodiment, computing system 200 is configured to implement a neural network (e.g., perceptron, convolutional neural network). An application executing on host CPU 210 utilizes driver 212 to send data and commands to GPU 205. Command processor 240 is configured to receive commands from host CPU 210 and utilize dispatch unit 250 to issue commands to compute units 255A-N. Compute units 255A-N are configured to read and write data to global data share 270, L1 cache 265, and L2 cache 260 within GPU 205, using the internal memory bandwidth. Although not shown in FIG. 2, compute units 255A-N can also include one or more caches and/or local memories within each compute unit 255A-N. These caches and/or local memories can also be included in the representation of the "internal memory" of GPU 205. Compute units 255A-N are also configured to read and write data to system memory 225 and/or local memory 230 via memory controller 220 utilizing the external memory bandwidth.

Data partitioning unit 245 can be implemented using any suitable combination of hardware and/or software. In one embodiment, command processor 240 includes channel data partitioning unit 245 to determine how to partition the channel data for the layer(s) of the neural network being implemented. In another embodiment, channel data partitioning unit 245 can be included as part of driver 212. In a further embodiment, channel data partitioning unit 245 can be split between driver 212, command processor 240, and/or one or more other locations. In one embodiment, channel data partitioning unit 245 determines how to partition the channel data for each neural network layer in order to minimize the external memory bandwidth utilization for the given layer of the neural network. In some embodiments, one or more layers of the neural network are merged. In these embodiments, partitioning unit 245 determines how to partition the channel data for the merged layers in order to minimize the external memory bandwidth utilization for the merged layers. Techniques for partitioning the channel data of the layers of the neural network so as to minimize the external memory bandwidth utilization are described in more detail in the remainder of this disclosure.

Figure 3:
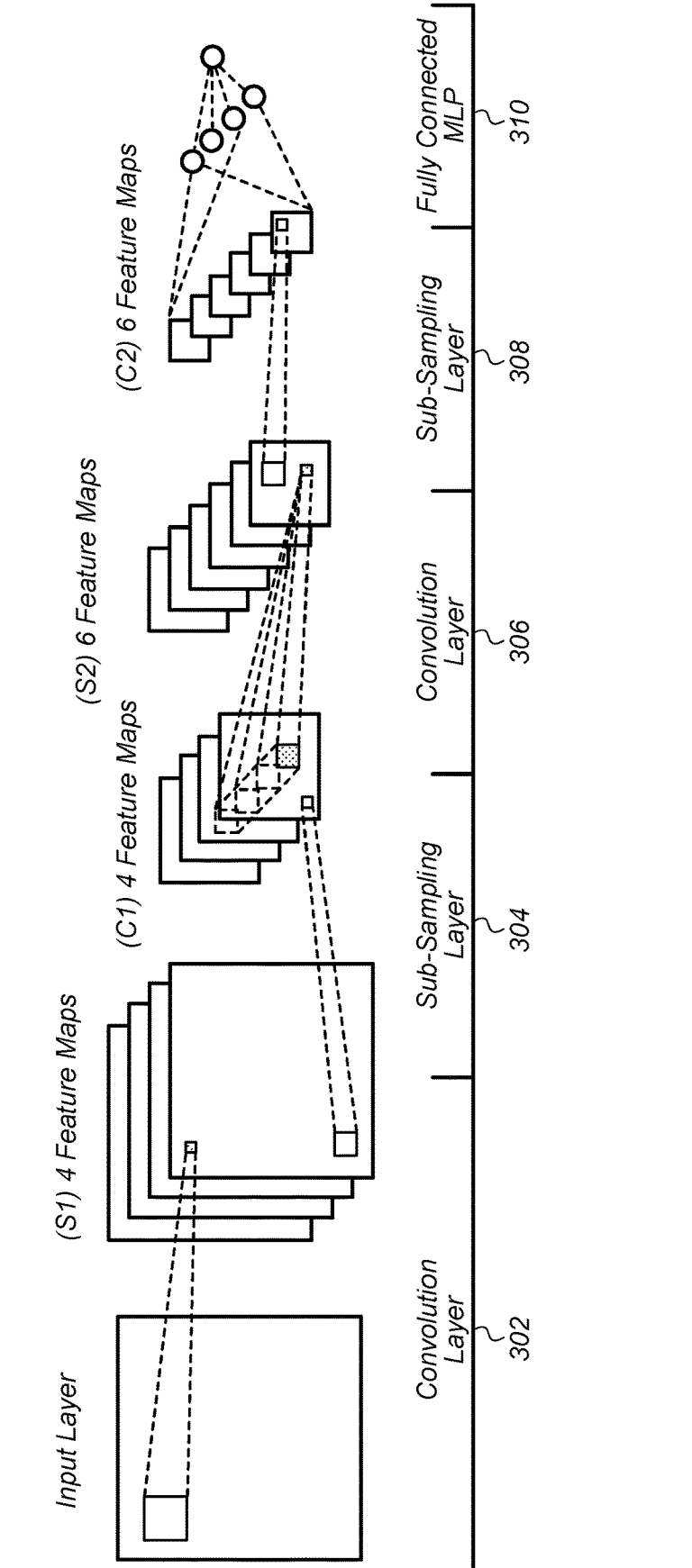
FIG. 3 is a block diagram of one embodiment of an implementation of a neural network.

Turning now to FIG. 3, a block diagram of one embodiment of an implementation of a neural network 300 is shown. Neural network 300 includes convolution layer 302, sub-sampling layer 304, convolution layer 306, sub-sampling layer 308, and fully connected layer 310. In other embodiments, neural network 300 can include other numbers and arrangements of layers.

When implementing neural network 300 on a computing system (e.g., system 100 of FIG. 1), the memory bandwidth requirements can be substantial. One or more techniques can be utilized when implementing neural network 300 on a computing system to reduce the amount of external memory bandwidth consumed. For example, a first technique involves reading an input channel once instead of multiple times, and then performing convolutions for the input channel for all features. For the first technique, the input channel read memory bandwidth is reduced by the number of channels. A second technique involves generating convolution output data for multiple channels for one or more features and then combining the convolution output data across the multiple channels prior to writing the convolution output data back to external memory. A third technique involves combining two or more layers of neural network 300 and performing the two or more layers in-line prior to writing output data back to the external memory. Other techniques can be utilized and/or combined with one or more of these three techniques in various embodiments.

Turning now to FIG. 4, a block diagram of one embodiment of an inference engine 400. Depending on the embodiment, inference engine 400 can be implemented on system 100 (of FIG. 1), on system 200 (of FIG. 2), or on another computing system. Inference engine 400 includes a plurality of channel processing engines 402A-N. It is noted that inference engine 400 can also be referred to as an inference accelerator. The number of channel processing engines 402A-N can vary from embodiment to embodiment. Channel processing engine 402A is expanded to show the components of a channel processing engine in accordance with one embodiment. The other channel processing engines 402B-N can include a similar arrangement of components.

The implementation of inference engine 400 illustrates a first technique for reducing external memory bandwidth utilization. Utilizing the first technique illustrated in FIG. 4, the input channel data for each channel is read one time rather than being read multiple times. Then, convolutions are performed for the input channel data for all of the features. For example, in one embodiment, input channel data 404 is read in for channel 0, and then convolutions are performed for all "M" features 410A-M. The number of "M" features can vary according to the layer and according to the embodiment. The result of the convolution of the input data with each feature is shown as the output data blocks 415A-M, and the output data 415A-M is written to external memory which is represented by blocks 420A-M. After the convolutions are performed for channel 0 for all M features, then convolutions are performed for channel 1 for all M features, convolutions are performed for channel 2 for all M features, and so on. The blocks 402B-N illustrate the convolutions which are performed for the other channels, with the resultant output data being written to external memory. The number "N" of channels can vary according to the layer of the neural network and according to the embodiment.

The adders 430A-M illustrate the sums which are calculated for each feature for all of the output channel data generated from the convolutions of all of the N channels. The sums generated by adders 430A-M are shown as blocks 440A-M. These sums can then be written to external memory after being calculated by adders 430A-M. After the sums are written to the external memory, one or more additional layers of a neural network can be implemented.

Referring now to FIG. 5, a block diagram of another embodiment of an inference engine 500 is shown. Inference engine 500 illustrates a second technique for reducing external memory bandwidth utilization. As shown in inference engine 500, data of a plurality of channels is loaded into the internal memory of a processing unit (e.g., GPU 205 of FIG. 2). The number of channels which are loaded into the internal memory is limited by the size of the internal memory of the processing unit.

In one embodiment, the channel blob shape representing the input data is split into three-dimensional (3D) blocks based on the internal memory size availability. Then, the convolution of "N" channels is performed for a first feature for each of the channels in convolution computation blocks 502A-N. The convolution output data of the N channels and feature 0 are added together by feature 0 adder 520A prior to writing any of the convolution output data of the N channels for feature 0 to external memory. Also, convolution of the N channels for the other M−1 features are also performed in parallel with the convolution of the N channels with feature 0. Each of the M features has a separate adder 520A-M which adds the convolution output data of the N channels for the respective feature prior to writing the convolution output data to external memory. Then, after adders 520A-M have generated sums for the different features 0 through M−1, the resultant sums are written to external memory as illustrated by blocks 530A-M.

Figure 6:
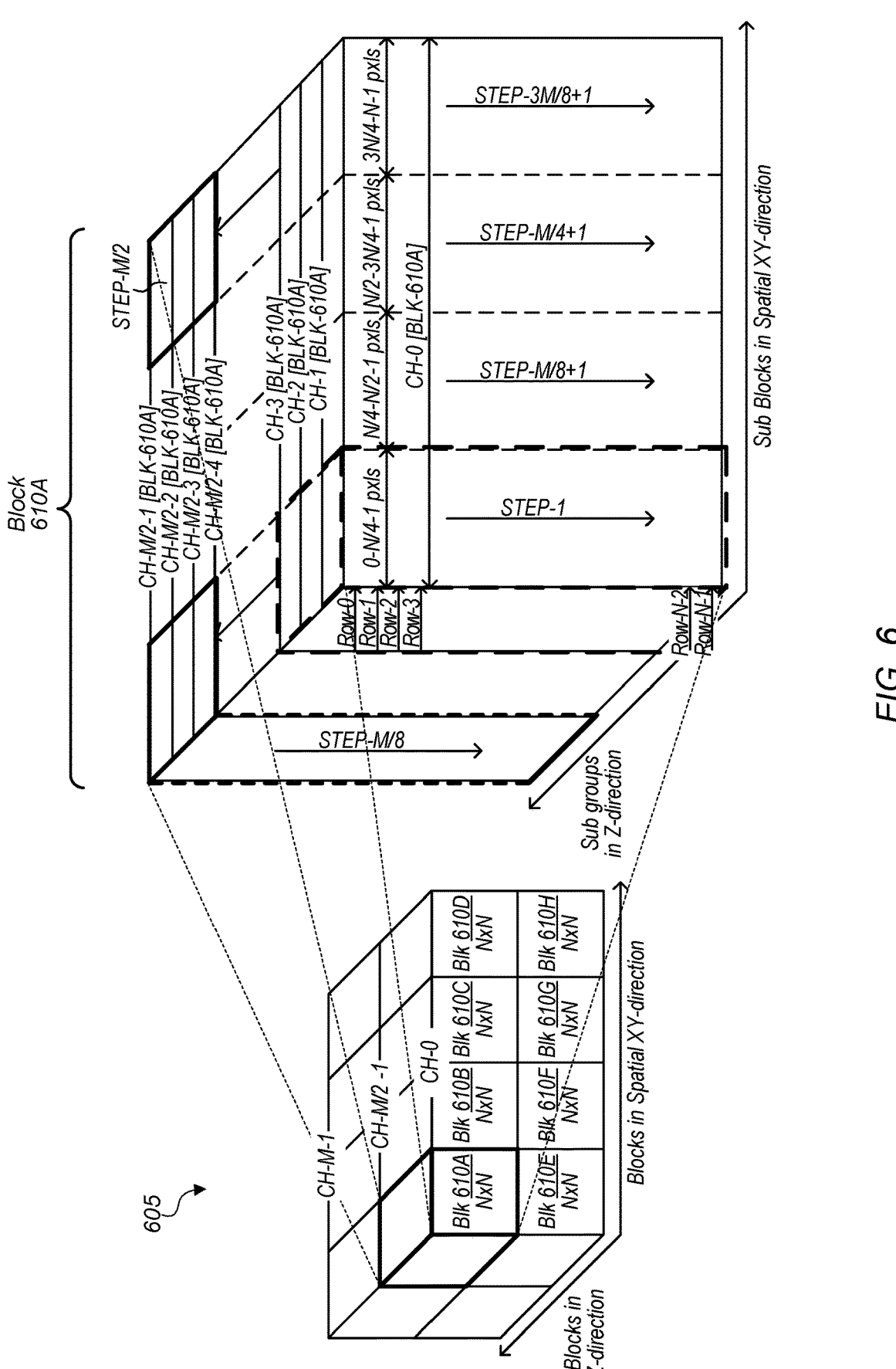
FIG. 6 is a block diagram of one embodiment of a partitioning channel data into 3D blocks.

Turning now to FIG. 6, a block diagram of one embodiment of partitioning channel data into three dimensional (3D) blocks is shown. The channel data 605 is shown as a 3D blob of data on the left-side of FIG. 6. In one embodiment, a channel data partitioning unit (e.g., channel data partitioning unit 245 of FIG. 2) determines how to partition channel data 605 into the blocks 610A-H (and the other unlabeled blocks on the back side of the 3D blob). For the purposes of this discussion, it is assumed that the entirety of the channel data 605 is partitioned into a total of 16 blocks, with each block of size N×N in the XY direction and size M/2 in the Z (or channel) direction. It should be understood that this partitioning is merely indicative of one particular embodiment. In other embodiments, the entirety of the channel data 605 can be partitioned into other numbers and sizes of blocks.

In one embodiment, blocks 610A-H of channel data 605 are loaded one block at a time from external memory into internal memory of the processing unit (e.g., GPU 205). For example, block 610A is loaded from external memory into internal memory and then a convolution operation and optionally one or more operations are performed on block 610A for the given layer(s) of the neural network and then the output data is written back to external memory. Then block 610B is loaded and the same operation(s) are performed prior to writing the output data back to external memory, then block 610C is processed, and so on. In another embodiment, the pattern of processing 3D blocks can vary, with block 610A processed first followed by block 610E, then block 610B, block 610F, and so on.

Block 610A is expanded on the right-side of FIG. 6 to illustrate how convolutions are performed in one embodiment after block 610A is loaded from external memory into internal memory of the processing unit. In one embodiment, the first convolution step (step 1) is performed for the left-most N/4 pixels of channel 0-3. Then, the second convolution step is performed for the left-most N/4 pixels of channels 4-7, then the third convolution step is performed for the left-most N/4 pixels of channels 8-11, and so on until step M/8 is implemented for the convolution of the left-most N/4 pixels of channels M/2−4 to M/2−1. After step M/8, the next step M/8+1 can come back to the front of block 610A starting from the second left-most column and working toward the back of block 610A. This pattern of processing the convolutions of block 610A with all of the features can continue until the right-most, back column of block 610A is reached. It is noted that the convolutions of the different portions of block 610A are performed without utilizing any external memory bandwidth. This helps to reduce the overall external memory bandwidth utilization for implementing the one or more layers of the neural network.

Referring now to FIG. 7, a block diagram of another embodiment of an inference engine 700 is shown. Inference engine 700 illustrates a third technique for reducing external memory bandwidth utilization. The third technique involves implementing multiple layers on a group of channel data after reading the group of channel data from external memory into internal memory and before writing output data to external memory. The traditional approach for implementing layers of a neural network is to perform the processing of a single layer on input data and then write the processed data back to external memory after the single layer has been completed. Then, the processed data is read back from external memory to implement the next layer of the neural network. This approach utilizes a large amount of external memory bandwidth.

To implement multiple layers the neural network, a group of channel data 705 is loaded from external memory into the internal memory of the processing unit implementing inference engine 700. In one embodiment, a convolution layer

710 is implemented as the first layer after loading the block of channel data from external memory.

Rather than writing the output of convolution layer 710 back to external memory, the output of convolution layer 710 is processed by the next layer of the neural network. As shown in FIG. 7, the next layer of the neural network is pooling layer 715. In other embodiments, other layers can follow the convolution layer 710. In one embodiment, a normalization layer 720 follows pooling layer 715, and then the result data 725 is written back to external memory. It should be understood that the example of combining a convolution layer with a pooling layer and normalization layer in inference engine 700 is merely illustrative of one embodiment. In other embodiments, other numbers and/or types of layers can be combined and implemented on a group of channel data 705 in an in-line operation before writing the output result data 725 back to the external memory.

Turning now to FIG. 8, a block diagram of one embodiment of using a vertical order for processing memory blocks to reduce external memory bandwidth utilization in a neural network implementation is shown. The group of channel data 800 is shown on the left-side of FIG. 8. The group of channel data 800 is partitioned into a plurality of 3D blocks 805A-P. In one embodiment, channel data 800 is partitioned into a plurality of 3D blocks 805A-P by a channel data partitioning unit (e.g., channel data partitioning unit 245 of FIG. 2).

After partitioning, in one embodiment, the top left 3D block 805A is processed by the inference engine (e.g., inference engine 700 of FIG. 7). Then, moving down the group of channel data 800, 3D block 805B is processed, then 3D block 805C, then 3D block 805D, then 3D block 805E, and so on. Each vertical column is processed from top to bottom, then the next column to the right is processed from top to bottom until all columns of the group of channel data 800 are processed.

On the right side of FIG. 8, the source pixels 810 at the boundary between 3D blocks 805A and 805E are shown. For generating convolution output pixels 815 on the boundary, source pixels 810 are utilized from both 3D block 805A and 3D block 805E. Also, the pool output pixels 820 of a pooling layer are shown on the bottom row of the diagram, and the pool output pixels 820 near the boundary use source pixels 810 from both 3D block 805A and 3D block 805E. Additionally, pixels at the top and bottom of each 3D block 805A-P require pixels from adjacent blocks. These fetches of extra lines from adjacent blocks result in extra fetches of data from external memory. Accordingly, an efficient technique for processing 3D blocks 805A-P is to use the processing pattern illustrated on the left-side of FIG. 8.

Figure 9:
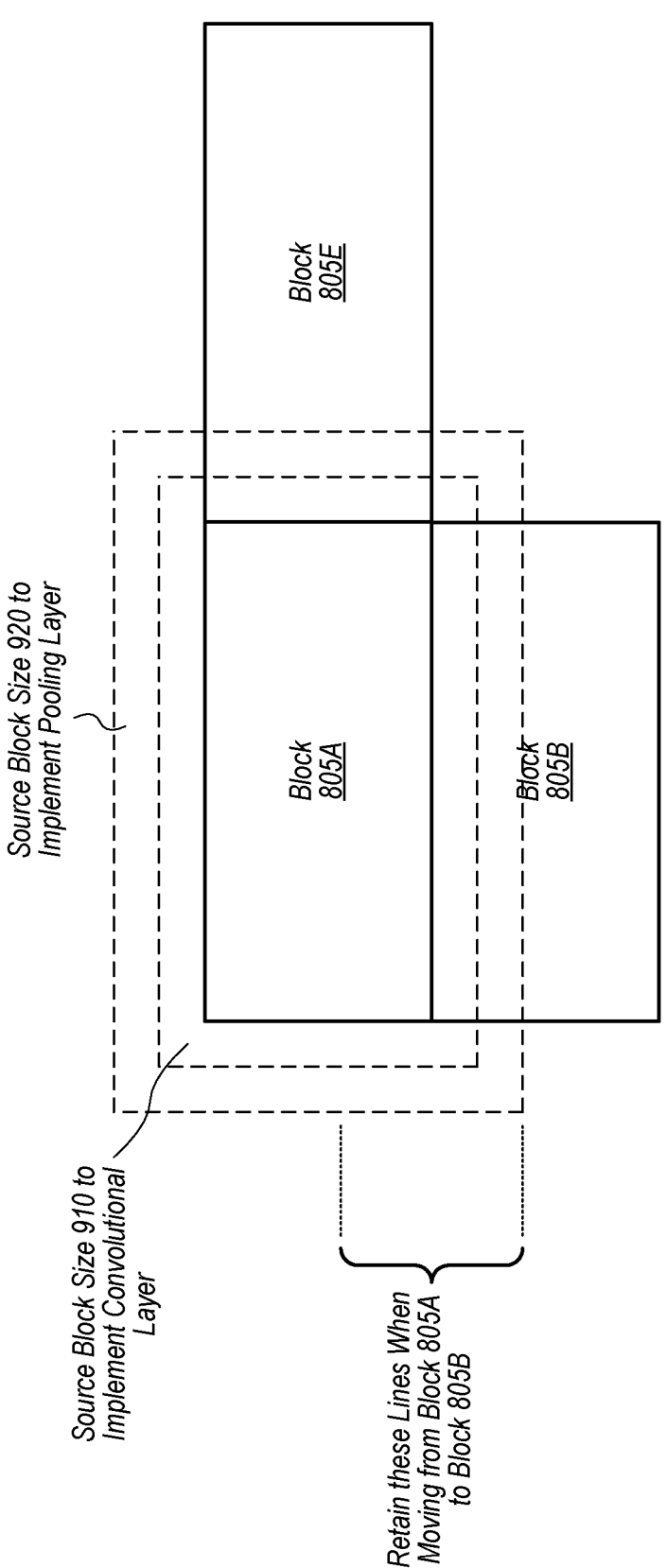
FIG. 9 is a block diagram of one embodiment of block sizes for implementing different layers of a neural network

Referring now to FIG. 9, a block diagram of one embodiment of block sizes for implementing different layers of a neural network. The discussion of FIG. 9 is intended to be a continuation of the discussion of FIG. 8. Blocks 805A, 805B, and 805E in FIG. 9 are meant to represent the same blocks 805A, 805B, and 805E of the group of channel data 800 of FIG. 8. To implement a convolutional layer, extra pixels from adjacent blocks are utilized to perform the processing of the convolutional layer. These extra pixels are shown in block 910, which includes extra pixels on each side of block 805A. Additionally, to implement a pooling layer, extra pixels from adjacent blocks are utilized to perform the processing of the pooling layer. These extra pixels are shown in block 920, which includes additional extra pixels (as compared to block 910) on each side of block 805A.

For the purposes of this discussion, it will be assumed that in one embodiment, each block 805A, 805B, and 805E includes 15 lines of pixels. In other embodiment, each block 805A, 805B, and 805E can include other numbers of lines of pixels. In the embodiment when blocks 805A, 805B, and 805E each include 15 lines of pixels, processing of block 805A, 15 lines of pixels will be fetched from external memory plus two extra lines of pixels to implement the convolutional and pooling layers. In other embodiments, other numbers of extra lines, besides two, might be needed to implement the convolutional and pooling layers (and any additional layers being implemented). Then, when moving to block 805B in the vertical direction, the bottom four lines of pixels are retained in internal memory from the previous processing operations of block 805A. The next 15 lines of pixels are fetched and then these 15 lines and the retained four lines are processed together for implementing the convolutional and pooling layers on block 805B. Since the bottom four lines of pixels are retained from the processing of block 805A, the refetching of these boundary lines is avoided. This helps to reduces the external memory bandwidth utilization when implementing the convolutional and pooling layers as processing moves between adjacent blocks in the vertical direction.

Turning now to FIG. 10, one embodiment of a method 1000 for implementing a convolutional layer is shown. For purposes of discussion, the steps in this embodiment and those of FIG. 11 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 1000.

A system detects a request to perform a convolution operation on input data of a plurality of channels (block 1005). For example, in one embodiment, the request can specify that a convolutional layer of a neural network should be implemented to process the input data from the plurality of channels. In one embodiment, the system includes at least a processing unit (e.g., GPU) coupled to an external memory. The processing unit includes an internal memory and various compute units, execution units, multiply-accumulator units (MACs), and/or other logic.

In response to detecting the request, the system partitions the input data of the plurality of channels into a plurality of three-dimensional (3D) blocks based on one or more factors (block 1010). Two of the three-dimensions (of the 3D blocks) correspond to the x,y spatial dimensions of the original input (e.g., image, video frame) and the third (or z) dimension corresponds to the plurality of channels. In one embodiment, the system partitions the input data into 3D blocks so as to minimize the external memory bandwidth utilization for the given layer of the neural network. In another embodiment, the system partitions the input data into 3D blocks based on a size of the internal memory, a size of the one or more features, and a size of the convolution. In other embodiments, the system can partition the input data into 3D blocks based on one or more other factors and/or to achieve one or more other goals.

Next, the system selects, for processing, a first 3D block from the partitioned 3D blocks (block 1015). Then, the system loads the selected 3D block from the external memory into the internal memory of the processing unit (block 1020). Next, the system generates convolution output data for the selected 3D block for one or more features (block 1025). Then, for each feature of the one or more features, the system adds convolution output data together across a first plurality of channels of the 3D block prior to writing the convolution output data to the external memory (block 1030). Next, the system writes, to the external memory, each sum of convolution output data, across the first plurality of channels, generated for a corresponding feature (block 1035). Then, the system determines if there are any other 3D blocks left to process (conditional block 1040). If there are any other 3D blocks left to process (conditional block 1040, "yes" leg), then the system selects the next 3D block to process (block 1045) and then method 1000 returns to block 1020. It is noted that the system can follow a particular pattern of processing 3D blocks in order to minimize the external memory bandwidth utilization. One example of a pattern is described in relation to FIG. 8. If all of the 3D blocks have been processed (conditional block 1040, "no" leg), then method 1000 ends.

Referring now to FIG. 11, one embodiment of a method 1100 for selecting an external memory bandwidth utilization technique to implement for an inference engine is shown. A request to implement one or more layers of a neural network is detected (block 1105). In one embodiment, the processing unit is a GPU. In other embodiments, the processing unit can be other types of processing units. In response to detecting the request, the processing unit determines the number of channels, the amount of channel data, and the type of processing associated with the layer(s) (block 1110). The processing unit can also determine other factors (e.g., number of features, size of features, stride) which are relevant to implementing the layer(s) of the neural network in block 1110.

Next, based on the factors determined in block 1110, the processing unit determines which one or more techniques of a plurality of external memory bandwidth reduction techniques to utilize (block 1115). For example, the processing unit can calculate an amount of external memory bandwidth that would be utilized for each technique. The processing unit can also calculate an amount of external memory bandwidth that would be utilized if two or more of the techniques were combined. The processing unit can then select the technique(s) that minimize the external memory bandwidth utilization. Then, the processing unit partitions the channel data according to the selected technique(s) and based on an amount of available internal memory of the processing unit (block 1120). Next, the processing unit implements the one or more layers of the neural network for each portion of the partitioned channel data (block 1125). Then, for each portion, the processing unit writes processed channel data to external memory (block 1130). After block 1130, method 1100 ends.

Figure 12:
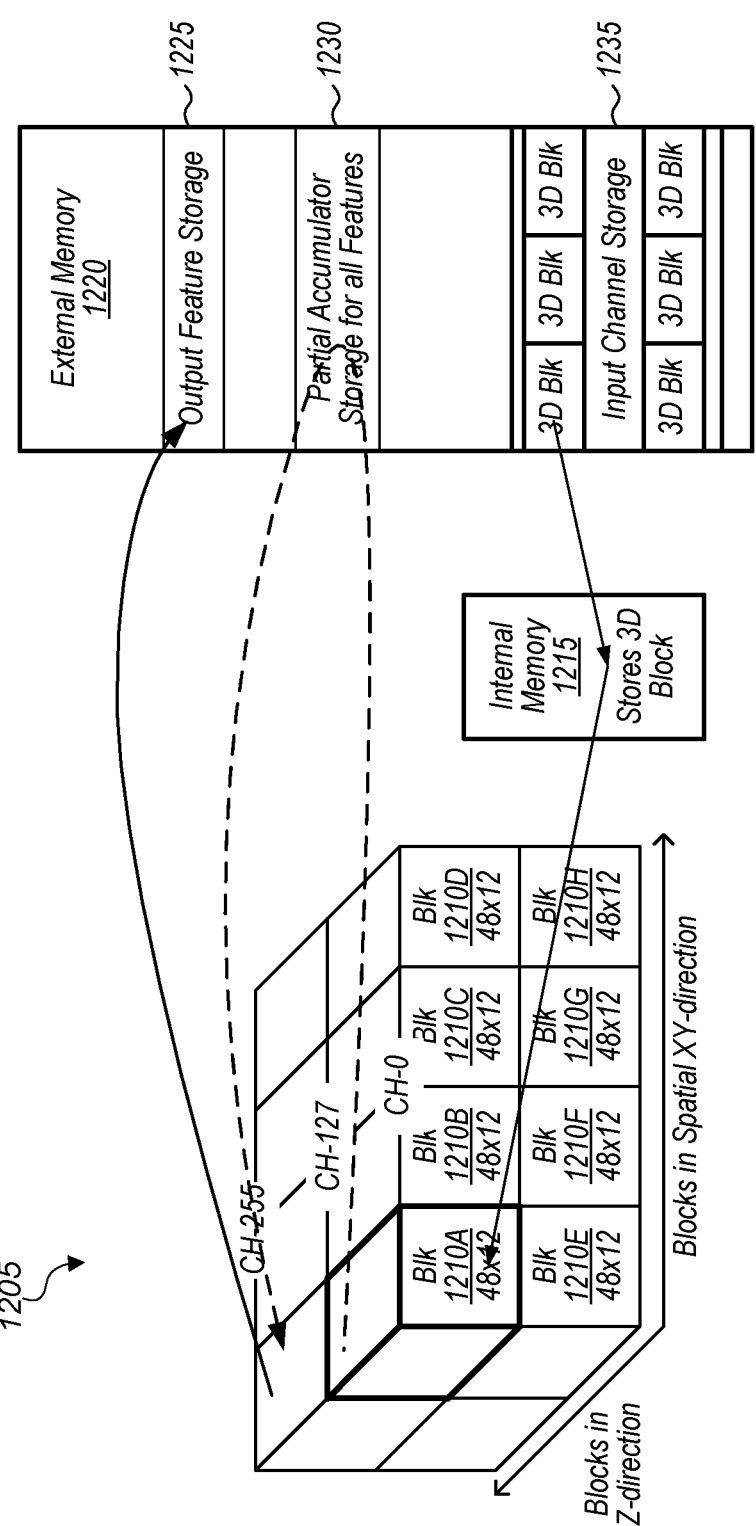
FIG. 12 is a block diagram of one embodiment of 3D blocks during convolution operations.

Turning now to FIG. 12, a block diagram of one embodiment of 3D blocks during convolution operations is shown. Input channel blob 1205 is shown on the left-side of FIG. 12. It should be understood that the dimensions of channel blob 1205 and blocks 1210A-H are indicative of one particular embodiment. In other embodiments, the dimensions of channel blob 1205 and of blocks 1210A-H can be different than what is shown in FIG. 12. In one embodiment, the 3D block dimensions of blocks 1210A-H are chosen based on the internal memory/cache size, the input 3D blob shape (channels x blob width x blob height), and the convolution kernel size. By reshaping the 3D block in the Z direction, the partial accumulator storage requirements and external memory bandwidth usage are reduced. In one embodiment, dynamically resizing of the 3D block size can be implemented in firmware and/or software prior to starting the convolution processing of the input channel blob 1205.

When block 1210A is processed, the processed block is retrieved from input channel storage 1235 in external memory 1220 and then stored in internal memory 1215. The size of internal memory 1215 is limited, and so the dimensions of blocks 1210A-H can be chosen such that a single block will fit into internal memory 1215.

Partial accumulator storage 1230 in external memory 1220 is utilized to store all features for the partially convoluted accumulated values on the first set of channels from 0-127. These partial values are written into external memory 1220 for all 3D blocks in the XY direction. Then, convolution processing moves in the Z direction to process the backside 3D blocks (the 3D blocks for channels 128-255). During the processing of the backside 3D blocks, the previous blocks' partially convoluted accumulated values 1230 are read from external memory 1220, and then these values are combined with the partially convoluted accumulated values from the backside blocks to get the final convolution output which is stored in the output feature storage region 1225 of external memory 1220. This convolution processing to generate the final convolution output requires additional read and write memory bandwidth associated with the partial accumulator storage 1230 when moving from the front-side to the backside of channel blob 1205.

Figure 13:
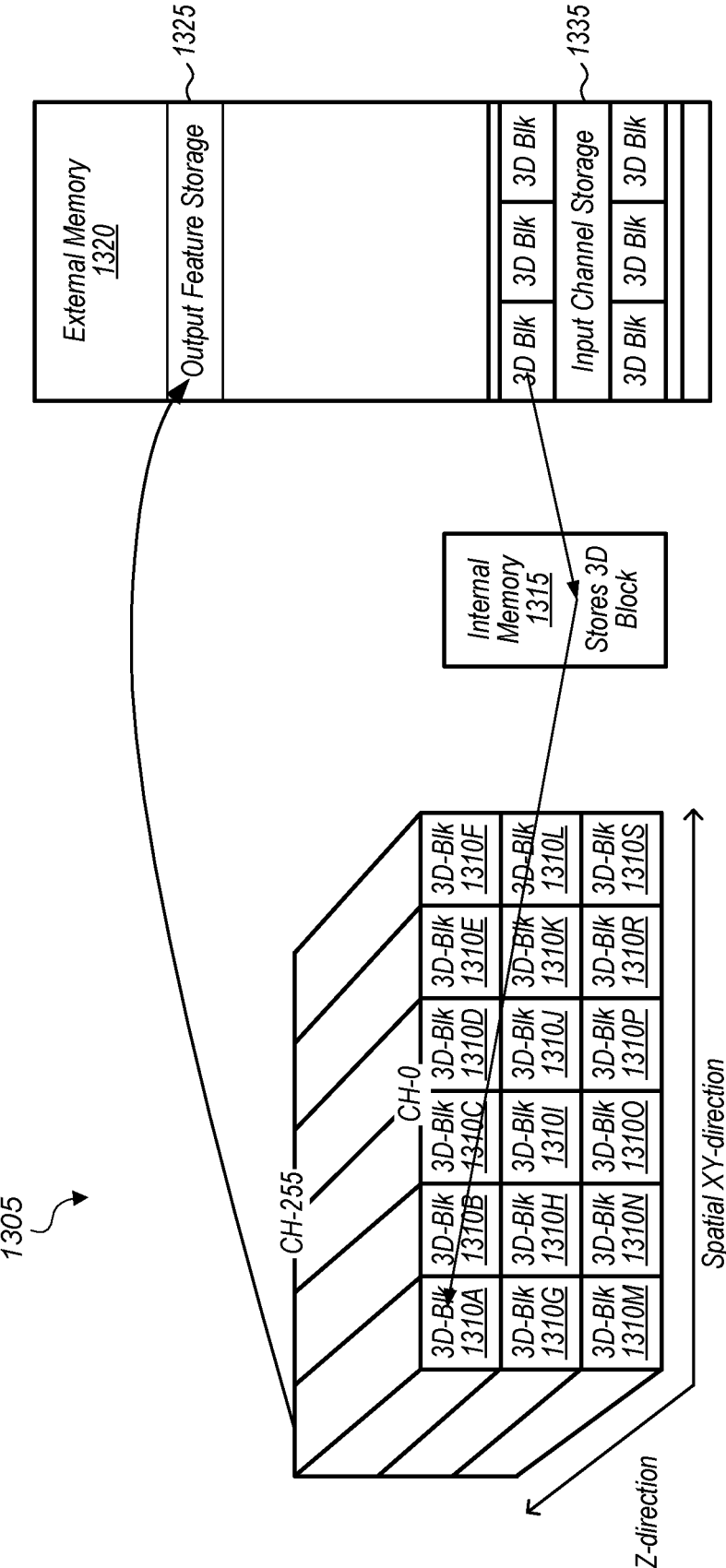
FIG. 13 is a block diagram of one embodiment of dynamically reshaping 3D blocks during convolution operations.

Referring now to FIG. 13, a block diagram of one embodiment of dynamically reshaping 3D blocks during convolution operations is shown. As shown on the left-side of FIG. 13, the input channel blob 1305 is partitioned into a plurality of 3D blocks 1310A-S. The dimensions of the 3D blocks 1310A-S are selected such that all of the channels 0-255 are included within a single block. Also, the dimensions of the 3D blocks are chosen so that an entire 3D block can fit within internal memory 1315 for all of the channels from channel 0 to channel 255. It should be understood that the example of input channel blob 1305 having 256 channels is merely illustrative of one embodiment. In other embodiments, the input channel blob 1305 can have other numbers of channels.

By reshaping the blocks 1310A-S in the Z direction, all of the input channels can be stored in internal memory 1315 to process the convolutions on all of the input channels of input channel blob 1305. This helps to minimize the external memory bandwidth associated with partial accumulator storage in external memory 1320. Compared with the example 3D block sizing shown in FIG. 12, only input channel reads from input channel storage 1335 and output feature writes end up using the external memory bandwidth. The reduction in external memory bandwidth usage allows for a reduction in the system power consumption.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a plurality of channel processing engines, each of the channel processing engines comprising circuitry configured to perform convolution computations for a channel of a plurality of channels;
   wherein a first channel processing engine of the plurality of channel processing engines is configured to:
      read first data corresponding to a first channel of the plurality of channels; and
      perform computations for a plurality of features using the first data, prior to performing a read of second data for a second channel of the plurality of channels.

2. The apparatus as recited in claim 1, wherein the first channel processing engine is configured to generate first output data responsive to the computations.

3. The apparatus as recited in claim 2, wherein subsequent to the computations for the plurality of features, a second channel processing engine of the plurality of channel processing engines is configured to:
   read second data corresponding to a second channel of the plurality of channels; and
   perform computations for the plurality of features using the second data, prior to performing a read of data for a third channel of the plurality of channels.

4. The apparatus as recited in claim 3, wherein the second channel processing engine is configured to generate second output data responsive to the computations using the second data.

5. The apparatus as recited in claim 4, further comprising a plurality of adders, each corresponding to a feature of the plurality of features.

6. The apparatus as recited in claim 5, wherein a first adder of the plurality of adders is configured to generate a sum of the first output data and the second output data.

7. The apparatus as recited in claim 4, wherein the apparatus is configured to read the first data corresponding to the first channel only once to produce both the first output data and the second output data.

8. The apparatus as recited in claim 2, wherein the first channel processing engine is configured to cause the first output data to be stored in an external memory.

9. A method comprising:
   reading, by a first channel processing engine of a plurality of channel processing engines, first data corresponding to a first channel of a plurality of channels, wherein each of the channel processing engines comprises circuitry configured to perform convolution computations for a channel of a plurality of channels; and
   performing, by the first channel processing engine, computations for a plurality of features using the first data, prior to performing a read of second data for a second channel of the plurality of channels.

10. The method as recited in claim 9, further comprising generating, by the first channel processing engine, first output data responsive to the computations.

11. The method as recited in claim 10, wherein subsequent to the computations for the plurality of features, the method comprises a second channel processing engine of the plurality of channel processing engines:

reading second data corresponding to a second channel of the plurality of channels; and performing computations for the plurality of features using the second data, prior to performing a read of data for a third channel of the plurality of channels.

12. The method as recited in claim 11, further comprising generating, by the second channel processing engine, second output data responsive to the computations using the second data.

13. The method as recited in claim 12, further comprising generating, by an adder of a plurality of adders, a sum of the first output data and the second output data.

14. The method as recited in claim 13, further comprising reading the first data corresponding to the first channel only once to produce both the first output data and the second output data.

15. The method as recited in claim 10, further comprising causing, by the first channel processing engine, the first output data to be stored in an external memory.

16. A system comprising:

a processing unit comprising internal memory;

an external memory coupled to the processing unit; and an inference engine comprising:

a plurality of channel processing engines, each of the channel processing engines comprising circuitry configured to perform convolution computations for a channel of a plurality of channels;

wherein a first channel processing engine of the plurality of channel processing engines comprises circuitry configured to:

read first data corresponding to a first channel of the plurality of channels from the external memory into the internal memory; and perform computations for a plurality of features using the first data, prior to performing a read of second data for a second channel of the plurality of channels.

17. The system as recited in claim 16, wherein the first channel processing engine is configured to generate first output data responsive to the computations.

18. The system as recited in claim 17, wherein the first channel processing engine is configured to cause the first output data to be stored in the external memory.

19. The system as recited in claim 16, wherein subsequent to the computations for the plurality of features, a second channel processing engine of the plurality of channel processing engines is configured to:

read second data corresponding to a second channel of the plurality of channels from the external memory into the internal memory; and perform computations for the plurality of features using the second data, prior to performing a read of data for a third channel of the plurality of channels.

20. The system as recited in claim 19, wherein the second channel processing engine is configured to generate second output data responsive to the computations using the second data.

* * * * *